United States Patent [19]

Minamizaki et al.

[11] Patent Number: 4,699,938

[45] Date of Patent: Oct. 13, 1987

[54] PRESSURE-SENSITIVE ADHESIVE COMPOSITION

[75] Inventors: Yoshihiro Minamizaki; Yoshio Miki; Takayuki Yamamoto, all of Osaka; Akira Iio; Toshinori Sakagami, both of Tokyo, all of Japan

[73] Assignees: Nitto Electric Industrial Co., Ltd., Osaka; Japan Synthetic Rubber Co., Ltd., Tokyo, both of Japan

[21] Appl. No.: 848,186

[22] Filed: Apr. 4, 1986

[30] Foreign Application Priority Data

Apr. 5, 1985 [JP]  Japan .................................. 60-73016

[51] Int. Cl.$^4$ ............................................. C08L 53/02
[52] U.S. Cl. .................................... 524/271; 525/89; 525/98; 525/314; 525/92
[58] Field of Search ..................... 525/89, 98; 524/271

[56] References Cited

U.S. PATENT DOCUMENTS 3,658,740  4/1972  Marrs et al. ............................ 525/89
3,784,587  1/1974  Chambers ............................... 525/98
3,972,848  8/1976  Lakshmanan ........................ 525/89

Primary Examiner—Wilbert J. Briggs, Sr.
Attorney, Agent, or Firm—Sughrue, Mion, Zinn, Macpeak, and Seas

[57] ABSTRACT

A pressure-sensitive adhesive composition comprising as a base polymer a mixed block copolymer comprising a polymer block of a monovinyl-substituted aromatic compound and a polymer block of a conjugated diene compound. The pressure-sensitive adhesive composition is useful to seal, for example, corrugated board or carton.

23 Claims, 1 Drawing Figure

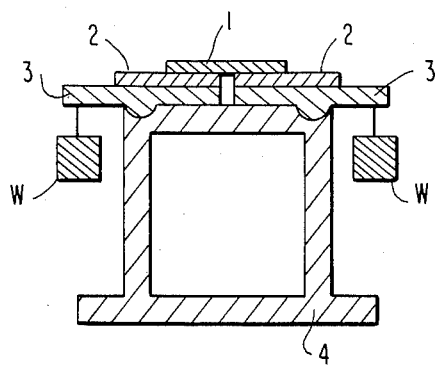

PRESSURE-SENSITIVE ADHESIVE COMPOSITION

FIELD OF THE INVENTION

This invention relates to a pressure-sensitive adhesive composition which contains as a base polymer, a block copolymer comprising a polymer block of a monovinyl-substituted aromatic compound and a polymer block of a conjugated diene compound, and is useful to seal, for example, a corrugated cardboard or a carton (hereinafter referred to as "corrugated cardboard" for simplicity).

BACKGROUND OF THE INVENTION

The conventional adhesive tapes in which pressure-sensitive adhesive compositions containing diene-based polymers such as natural rubber and styrenebutadiene copolymer as a base polymer are used are produced by applying an adhesive solution prepared by mixing and dissolving base polymer, tackifier resin, softening agent, stabilizer, filler, pigment and other additives in an organic solvent to a tape substrate, evaporating and removing the organic solvent by passing the coated tape through a drier, and then winding up and cutting the dried tape.

However, in recent years, the possibility of introducing the hot melt production technique into the above production process has been investigated from the standpoints of increased productivity, environmental pollution prevention, safety from fire and so forth, and such technique is now under the commercial utilization in some sections, in particular in the production of pressure-sensitive adhesive tapes for packaging purposes. The base polymers for pressure-sensitive adhesive compositions used in the above technique are mainly an A-B-A type block copolymer. In the prior art, each A in the above copolymers is a polystyrene block and B is a polyisoprene or polybutadiene block, and the above two A blocks have substantially the same number average molecular weight in the range of from 10,000 to 20,000. Pressure-sensitive adhesive compositions using such block copolymers are disclosed in detail, for example, in U.S. Pat. No. 3,239,478.

However, when pressure-sensitive adhesive compositions using the conventional block copolymers are applied as adhesive tapes for packaging there is the disadvantage that the sealing of corrugated cardboard is poor.

The base polymer which has been conventionally used as the base polymer in pressure-sensitive adhesive compositions for the adhesive tapes for packaging is a natural rubber and, even when corrugated cardboard flaps are sealed with such tapes under a light pressure by hand, good corrugated cardboard sealing can be achieved because a sufficient adhering area can be secured and the repulsive force of corrugated cardboard flaps, even if strong, can be relaxed as a result of shearing displacement of the adhesive in the manner of cohesive failure, so that the adhesive can still hold the corrugated cardboard flaps in that displaced state.

On the other hand, adhesive tapes using pressure-sensitive adhesive compositions comprising the above described A-B-A type block copolymers as the base polymers, when applied for corrugated cardboard flap sealing under light pressure, cannot secure a sufficient adhering area because the cohesive strength the adhesive is too great. Furthermore, in such a case, the adhesive does not undergo cohesive failure-like displacement, so that the adhesive cannot resist the repulsive strength the corrugated cardboard flaps and is peeled from the corrugated cardboard surface in the manner of adhesive failure. The so-called hop-up state is encountered frequently.

For avoiding such disadvantage of the adhesive tapes using A-B-A type block copolymers, the possibility of using an A-B type block copolymer in combination with the A-B-A type block copolymer has been investigated. However, any satisfactory result has not been obtained to improve the corrugated cardboard sealing property (effect). In particular, this and other improving means in the prior art have generally the problem that the function of an adhesive to relax the stress of corrugated cardboard flaps due to cohesive failure-like displacement is contradictory to the function to hold the flaps.

SUMMARY OF THE INVENTION

As a result of intensive study to overcome the problem in the prior art, it has been found that the two A blocks, i.e., polystyrene blocks, in the A-B-A type block copolymers have substantially the same molecular weight as described above, when a specific A-B-A type block copolymer in which the two A blocks have different molecular weight, viz., are asymmetric from the standpoint of the molecular weight, is used in combination with, for example, the above-described conventional block copolymers, pressure-sensitive adhesive compositions capable of providing adhesive tapes having both the function to relax the stress of corrugated cardboard flaps due to cohesive failure-like displacement of the adhesive and the function to hold the flaps and also an excellent sealing property of corrugated cardboard can be obtained.

Accordingly, an object of the present invention is to overcome the above problem in the prior art which is concerned with adhesive tapes using pressure-sensitive adhesive compositions containing A-B-A type block copolymers as a base polymer and, more particularly, to provide a pressure-sensitive adhesive composition capable of providing an adhesvie tape having both the function to relax the stress of corrugated cardboard flaps due to cohesive failure-like displacement of the adhesive and the function to hold the flaps and also an excellent cardboard sealing property.

The pressure-sensitive adhesive composition according to the present invention comprises 100 parts by weight of a mixed block copolymer comprising (a) at least 50% by weight of an $A_1$-$B_1$-$A_2$ type block copolymer, wherein $A_1$ and $A_2$ each is a polymer block of a monovinyl-substituted aromatic compound, $B_1$ is a Polymer block of a conjugated diene compound, $A_1$ has a number average molecular weight of 10,000 or more, $A_2$ has a number average molecular weight of 5,000 or less, and the total content of $A_1$ and $A_2$ in the copolymer is 50% by weight or less based on the weight of the block copolymer; and (b) 50% by weight or less of an $A_3$-$B_2$-$A_4$ type block copolymer and/or an $(A_5$-$B_3)_n X$ type block copolymer, wherein $A_3$, $A_4$ and $A_5$ each is a polymer block of a monovinyl-substituted aromatic compound, having a number average molecular weight of 8,000 or more, $B_2$ and $B_3$ each is a polymer block of a conjugated diene compound; X is a residue of the coupling agent, n is an integer of 2 to 6, and the total contents of $A_3$ and $A_4$ and the total content of $n \times A_5$ each is 50% by weight or less based on the weight of the respective copolymer, and from 20 to 400 parts by weight of a tackifier resin.

BRIEF DESCRIPTION OF THE DRAWING

The FIGURE shows a method used for testing pressure-sensitive adhesive tapes for corrugated cardboard sealing effect using a flap test apparatus.

DETAILED DESCRIPTION OF THE INVENTION

The term "number average molecular weight" as used herein means a number average molecular weight as determined by GPC (Gel Permeation Chromatography), calculated as polystyrene.

The $A_1$-$B_1$-$A_2$ type block copolymer which is used as the component (a) in the present invention is a triblock copolymer wherein $A_1$ and $A_2$ each is a polymer block of a monovinyl-substituted aromatic compound such as styrene, α-methylstyrene, vinyltoluene or vinylxylene, and $B_1$ is a polymer block of conjugated diene compound such as isoprene, 1,3-butadiene or 1,3-pentadiene. Of those, a triblock copolymer wherein $A_1$ and $A_2$ each is a polystyrene block and $B_1$ is a polyisoprene block is particularly preferred.

The $A_1$ constituting the triblock copolymer has a number average molecular weight of 10,000 or more, preferably from 12,000 to 40,000, and $A_2$ has a number average molecular weight of 5,000 or less, preferably from 500 to 3,000. By selecting the molecular weight of $A_1$ and $A_2$ as above, the initial tack, in particular, cold tack (i.e., low temperature tack), and the adhesive strength of the adhesive are satisfactory, and the function to relax the stress of corrugated cardboard flaps due to the cohesive failure-like displacement as a result of an appropriate decrease in the cohesive strength imparted, whereby good results in markedly improving the sealing property can be obtained. The total molecular weight of this triblock copolymer can be appropriately selected depending on the desired characteristics of the adhesive tapes. Generally, however, the number average molecular weight of the copolymer is preferably within the range of from 50,000 to 700,000.

The total content of $A_1$ and $A_2$ in the triblock copolymer should be 50% by weight or less based on the weight of the whole copolymer. The preferred total content is from 8 to 30% by weight, and more preferred total content is from 10 to 20% by weight. When the content is more than 50% by weight, the copolymer disadvantageously lacks in the elastic property required in the adhesives of this type.

The $A_3$-$B_2$-$A_4$ type block copolymer which is used as another component (b) in the present invention is a triblock copolymer wherein $A_3$ and $A_4$ each is a polymer block of a monovinyl-substituted aromatic compound such as styrene, α-methylstyrene, vinyltoluene or vinylxylene, and $B_2$ is a polymer block of a conjugated diene compound such as isoprene, 1,3-butadiene or 1,3-pentadiene. Of those, a triblock copolymer wherein $A_3$ and $A_4$ each is a polystyrene block and $B_2$ is a polyisoprene block is particularly preferred.

The blocks $A_3$ and $A_4$ constituting the triblock copolymer each has a number average molecular weight of 8,000 or more, preferably from 12,000 to 40,000. If the molecular weight is lower than 8,000, the cohesive strength of the adhesive becomes too low and decreases the corrugated cardboard flap holding ability. The molecular weight of $A_3$ and that of $A_4$ may be the same or different so long as those are within the specified range. It is, however, preferred that the difference in molecular weight between the two A blocks is about 4,000 or less. Similar to the case of the above-described component (a), it is preferred that the total number average molecular weight of this triblock copolymer should be within the range of from 50,000 to 700,000.

Similar to the case of the total content of $A_1$ and $A_2$ in the above-described component (a), the total content of $A_3$ and $A_4$ in the triblock copolymer should be 50% by weight or less from the standpoint of the elasticity of the adhesive. The preferred total content is from 8 to 30% by weight, and more preferred content is from 10 to 20% by weight.

The $(A_5$-$B_3)_n X$ type block copolymer, which is another component in the component (b) used in the present invention, is a radial or straight-chain block copolymer wherein $A_5$ is a polymer block of a monovinyl-substituted aromatic compound such as styrene, α-methylstyrene, vinyltoluene or vinylxylene, $B_3$ is a polymer block of a diene compound such as isoprene, 1,3-butadiene or 1,3-pentadiene, X is the residue of a coupling agent such as silicon tetrachloride, silicon tetrabromide, dimethyldichlorosilane, monomethyldichlorosilane, 1,2-bis(trichlorosilyl)ethane, dichloroethane, methylene chloride, dibromoethane, divinylbenzene, divinyltoluene, dibromomethane or tin tetrachloride, and n is an integer of 2 to 6, preferably 2 to 4. Of those a block copolymer wherein $A_5$ is a polystyrene block and $B_3$ is a polyisoprene block is particularly preferred.

The molecular weight of $A_5$ which constitutes this block copolymer and the total content of the $n \times A_5$ blocks are within the same ranges as in the molecular weights of $A_3$ and $A_4$ and the total content of $A_3$ and $A_4$ in the $A_3$-$B_2$-$A_4$ type block copolymer, respectively. In other words, $A_5$ constituting the block copolymer has a number average molecular weight of 8,000 or more, preferably from 12,000 to 40,000, and the total content of $n \times A_5$ is 50% by weight or less, preferably from 8 to 30% by weight, more preferably from 10 to 20% by weight, based on the weight of the whole polymer. Further, similar to the case of the above-described block copolymer $A_3$-$B_2$-$A_4$, the total number average molecular weight of this block copolymer should be within the range of from 50,000 to 700,000.

Those block copolymers constituting the components (a) and (b) can be easily obtained by the conventional living anion polymerization method using a lithium-based initiator or, for the $(A_5$-$B_3)_n X$ type block copolymers, by conducting, following the above polymerization, the conventional coupling reaction using an appropriate coupling agent. These methods are described, for example, in Japanese Patent Publications Nos. 24914/65 and 35112/78 and Japanese Patent Application (OPI) No. 120622/78 (The term "OPI" used herein means a "published unexamined Japanese patent application").

In practicing the present invention, it is important to use the above component (a), namely the $A_1$-$B_1$-$A_2$ type block copolymer, and the above component (b), namely either one or both of the $A_3$-$A_2$-$A_4$ type block copolymer and the $(A_5$-$B_3)_n X$ type block copolymer, in combination. This combined use makes it possible for the first time to meet the requirements relating to the initial tack and adhesive strength, and render the function to relax the stress of corrugated cardboard flaps due to cohesive failure-like displacement of the adhesive consistent with the flap holding ability, thereby markedly improving the corrugated cardboard sealing effect.

The reason why the component (a) is used in combination with the component (b) in the present invention is that when the component (a) is used alone, the corrugated cardboard flap holding ability and adhesive strength are still insufficient, hence marked improvement in the corrugated cardboard sealing effect cannot be expected, although good results may be obtained with respect to cold tack and occurrence of cohesive failure-like displacement.

In using the component (a) and component (b) in combination, the mixing ratio therebetween is such that the amount of the component (a) is 50% by weight or more, preferably from 50 to 95% by weight, more preferably from 60 to 90% by weight, and the amount of the component (b) is 50% by weight or less, preferably from 5 to 50% by weight, more preferably from 10 to 40% by weight. When the proportion of component (a) is less than 50% by weight, viz., the proportion of component (b) is more than 50% by weight, the function of the adhesive to relax the stress of corrugated cardboard flaps due to its cohesive failure-like displacement cannot be consistent with the function to hold the flaps and, as a result, the effect of improving the corrugated cardboard sealing ability is disadvantageously decreased.

The tackifier resin which can be used in the present invention in combination with the mixed block copolymer includes any conventional tackifier resins which are either liquid or solid at room temperature. The examples thereof include terpene resins, terpene-phenol resins, terpene-aromatic resins, coumarone-indene resins, styrenic resins, petroleum resins, phenol resins, xylene resins and rosin resins. Those resins can be used alone or as mixtures thereof.

The tackifier resin is preferably used in an amount of from 20 to 400 parts by weight, more preferably from 50 to 300 parts by weight, per 100 parts by weight of the mixed block copolymer. If the amount thereof is less than 20 parts by weight, it is difficult to impart a good initial tack to the adhesive, and if the amount thereof is more than 400 parts by weight, the cohesive strength deteriorates. Thus, in either case, good results cannot be obtained with respect to the corrugated cardboard sealing effect.

The pressure-sensitive adhesive composition according to the present invention contains the mixed block copolymer and the tackifier resin as the essential components and can further contain various polymer components, namely elastomers and/or plastomers other than the above mixed block copolymer components for the purpose of slight modifications of adhesive characteristics.

Such polymer components include various elastomers such as block copolymers having the same structures as in the block copolymers (a) and (b) except that at least one of the number average molecular weights of $A_1$, $A_2$, $A_3$, $A_4$ and $A_5$, the total content of $A_1$ and $A_2$, the total content of $A_3$ and $A_4$, and the total contents of $n \times A_5$ is outside the range specified in the present invention or block copolymers quite different in structure from the above-described block copolymers (a) and (b), such as A-B type block copolymers; and various plastomers comprising thermoplastic resins such as ethylene-vinyl acetate copolymer and acrylonitrile-butadiene copolymer. The amount of those polymer components is 50 parts by weight or less, preferably 30 parts by weight or less, per 100 parts by weight of the above mixed block copolymer. If the amount thereof is too large, it is difficult to achieve the object of the present invention.

The pressure-sensitive adhesive composition according to the present invention may further contain a softening agent such as process oil, plasticizer polyester, polybutene or liquid rubber, if necessary. The amount of this softening agent if used is 75 parts by weight or less, preferably from 5 to 75 parts by weight, per 100 parts by weight of the above-described mixed block copolymer.

Furthermore, the pressure-sensitive adhesive composition according to the present invention may contain various additives conventionally used in pressure-sensitive adhesive compositions, such as antioxidants, ultraviolet absorbers, fillers, pigments and extenders, in amounts conventionally used.

The pressure-sensitive adhesive composition thus prepared according to the present invention above can be used in the form of a non-solvent type hot melt adhesive, a solution type adhesive using an appropriate organic solvent such as toluene, or an aqueous or non-aqueous emulsion type adhesive. In the case of solution type, the adhesive is advantageous from the industrial viewpoint over the conventional adhesives based on natural rubber or the like since the solution viscosity is lower and accordingly high solids coating becomes possible.

Adhesive tapes using the pressure-sensitive adhesive composition according to the present invention can be produced in the conventional manner. For instance, the adhesive tapes can be easily produced by coating a conventional substrate such as a polyester film, with the composition which may be of any type described above, by an appropriate means selected depending on the type of composition, followed by necessary steps such as a drying step. In this case, the thickness of the adhesive layer can be selected depending on the intended use of the tapes, but is generally within the range of from about 5 to 500 $\mu$m.

As described hereinabove, the present invention can provide, by the use of a specific mixed block copolymer composed of the above-described components (a) and (b) as the base polymer, a pressure-sensitive adhesive composition capable of providing an adhesive tape which can meet the requirements in the initial tack, in particular cold tack, and adhesive strength and in which the function of the adhesive to relax the stress of corrugated cardboard flaps due to its cohesive failure-like displacement is consistent with the function to hold the flaps so that excellent corrugated cardboard sealing effect can be obtained.

The present invention is now explained in greater detail by reference to the following Examples and Comparative Examples. Unless otherwise indicated, all percents, parts, ratios and the like are by weight.

The block copolymers A to H used in the examples and comparative examples were synthesized in the following manner.

BLOCK COPOLYMER A

An autoclave washed and dried, and equipped with a stirrer and a jacket was charged with 2,500 parts of a mixed solvent of cyclohexane and n-pentane in a weight ratio of 9:1 and 0.13 part of tetrahydrofuran in a nitrogen atmosphere, and the autoclave inside temperature was raised to 60° C. A hexane solution containing 0.113 part of n-butyllithium was added and 37.5 parts of styrene was then added to the autoclave, followed by polymerization for 60 minutes. The conversion of styrene was 100%. 425 Parts of isoprene was added and polymerization was conducted for 60 minutes. The conversion of isoprene was 100%. Finally, 37.5 parts of styrene was added, followed by polymerization for 60 minutes. The conversion of styrene in this case was 100%.

In each polymerization step described above, the reaction system was maintained at a temperature of 60° to 70° C. To the thus-obtained polymer solution was added 3.0 parts of 2,6-di-tert-butyl-p-cresol, and the mixed solvent of cyclohexane and n-pentane was then removed by heating to obtain a block copolymer A of the $S_1$-I-$S_2$ type, wherein $S_1$ and $S_2$ each is a polystyrene block and I is a polyisoprene block. The number average molecular weight of each block and the total content of $S_1$ and $S_2$ in the copolymer were as shown in Table 1 below.

BLOCK COPOLYMERS B TO F

Block copolymers B to F of the type $S_1$-I-$S_2$ were obtained in the same manner as in the block copolymer A above except that the amount of the polymerization initiator, amount of monomers and polymerization time were changed. The number average molecular weight of each of the constituent blocks $S_1$, I and $S_2$ and the total content of $S_1$ and $S_2$ in each copolymer are shown in Table 1 below.

BLOCK COPOLYMER G

A block copolymer G of the $S_1$-I type was obtained in the same manner as in the block copolymer A except that the amount of isoprene was changed and the step of final addition and polymerization of styrene was omitted. The number average molecular weight of each of the constituent blocks $S_1$ and I and the content of $S_1$ in the copolymer are as shown in Table 1 below.

BLOCK COPOLYMER H

An autoclave washed and dried, and equipped with a stirrer and a jacket was charged with 2,500 parts of a mixed solvent of cyclohexane and n-pentane in a weight ratio of 9:1 and 0.104 part of n-butyl lithium. 35.8 Parts of styrene was added and allowed to polymerize for 60 minutes. The conversion of styrene was 100%. 216 Parts of isoprene was added, followed by polymerization for 60 minutes. The conversion of isoprene was 100%. Finally, 0.153 part of 1,2-dibromoethane was added to conduct a coupling reaction. The coupling reaction proceeded substantially completely.

In conducting each reaction above, the temperature of the reaction system was maintained at 60° to 70° C. To the thus-obtained polymer solution was added 3.0 parts of 2,6-di-tert-butyl-p-cresol, and the cyclohexane-n-pentane mixed solvent was then removed by heating to obtain a block copolymer of the $(S_1$-I$)_2$X type, wherein $S_1$ is a polystyrene block, I is a polyisoprene block and X is the residue of 1,2-dibromoethane added as a coupling agent. The number average molecular weight of each of $S_1$ and I and the total content of two $S_1$ blocks in the copolymer are as shown in Table 1 below.

TABLE 1

| Block copolymer | | Number average molecular weight | | | Polystyrene content (*1) |
|---|---|---|---|---|---|
| Designation | Structure | $S_1$ | I | $S_2$ | (% by weight) |
| A | $S_1$—I—$S_2$ | 19,500 | 220,000 | 19,500 | 15 |
| B | $S_1$—I—$S_2$ | 18,500 | 110,000 | 1,000 | 15 |
| C | $S_1$—I—$S_2$ | 17,500 | 110,000 | 2,000 | 15 |
| D | $S_1$—I—$S_2$ | 16,500 | 110,000 | 3,000 | 15 |
| E | $S_1$—I—$S_2$ | 13,500 | 110,000 | 6,000 | 15 |
| F | $S_1$—I—$S_2$ | 20,000 | 120,000 | 2,000 | 15 |
| G | $S_1$—I | 19,500 | 110,000 | — | 15 |
| H | $(S_1$—I$)_2$X | 20,000 | 120,000 | — | 14 |

Note 1:
Block copolymers A–F; Total content of $S_1$ and $S_2$
Block copolymer G; $S_1$ content
Block copolymer H; Total content of two $S_1$ blocks

EXAMPLES 1 TO 3

Three pressure-sensitive adhesive compositions according to the invention were prepared by blending the block copolymers A to D with a tackifier resin, a softening agent and an antioxidant, each shown in Table 2, according to the formulation also shown in Table 2 and further blending the mixture with toluene to dissolve the mixture therein. Each composition was applied to a 50 μm thick polyester film in the dry thickness of 30 μm. The coated film was dried by heating in a drier to obtain a pressure-sensitive adhesive tape.

COMPARATIVE EXAMPLES 1 TO 3

Three pressure-sensitive adhesive compositions for comparison were prepared by blending the block copolymer A, E or G with a tackifier resin, a softening agent and an antioxidant, each shown in Table 2, according to the formulation also shown in Table 2 and further dissolving the resulting mixture in toluene. Using these compositions, pressure-sensitive adhesive tapes were prepared in the same manner as in Examples 1 to 3.

The pressure-sensitive adhesive tapes of Examples 1 to 3 and comparative Examples 1 to 3 obtained above were tested by the methods described below for cold tack, adhesive strength and corrugated cardboard sealing ability (1). The results obtained are shown in Table 2 below.

COLD TACK

According to the PSTC #6 rolling ball tack testing method, the distance of rolling of the ball was measured at an ambient temperature of 10° C. Each measurement value reported is the average value of 5 samples.

ADHESIVE STRENGTH

In accordance with JIS Z 0237, a 15 mm wide tape sample was adhered to a stainless steel plate under a load of 2 kg under ambient conditions of 23° C. and 65% RH. Using this test piece and a Toyo Seiki autograph, the tape sample was peeled from the stainless steel plate at an angle of 180° at a pull rate of 300 mm/minute. The force required for separation was expressed as the adhesive strength. Each measurement value is the average value of 5 samples.

CORRUGATED CARDBOARD SEALING TEST (1)

Two 40 mm×40 mm pieces of corrugated cardboard were cut from a commercially available corrugated cardboard box (K linerboard). One end of one piece was brought into contact with one end of another piece without overlapping and a 10 mm wide tape was applied in a length of 40 mm to the pieces to cover the joint under 10 applications of a 2 kg roll load under ambient conditions of 25° C. and 65% RH. Using a flap testing apparatus shown in the drawing, the assembly was loaded (200 g×2) and the time required for the weights to come down was measured. Each measurement value shown is average value of 5 samples.

In the drawing, 1 is a tape sample, 2 and 2 are two corrugated cardboard pieces, 3 and 3 are mobile plates the inside ends of which can rise upon application of loads (W), and 4 is the body of the flap testing apparatus.

TABLE 2

|  | Example | | | Comparative Example | | |
| --- | --- | --- | --- | --- | --- | --- |
|  | 1 | 2 | 3 | 1 | 2 | 3 |
| Adhesive composition (parts) | | | | | | |
| Block copolymer A | 20 | 20 | 20 | 20 | 20 | 100 |
| Block copolymer B | 80 | | | | | |
| Block copolymer C | | 80 | | | | |
| Block copolymer D | | | 80 | | | |
| Block copolymer E | | | | | 80 | |
| Block copolymer G | | | | 80 | | |
| Tackifier resin (1) | 100 | 100 | 100 | 100 | 100 | 100 |
| Softening agent (2) | 40 | 40 | 40 | 40 | 40 | 40 |
| Antioxidant (3) | 2 | 2 | 2 | 2 | 2 | 2 |
| Characteristics tested | | | | | | |
| Cold tack (cm) | 11 | 11 | 12 | 11 | 14 | 18 |
| Adhesive strength (kg/cm) | 1.2 | 1.3 | 1.3 | 1.0 | 1.0 | 0.6 |
| Corrugated cardboard sealing test (1) (min) | 950 | 1000 or more | 1000 or more | 365 | 280 | 40 |

Note (1) "ESCOREZ 1310" (trademark), a product of Exxon Chemical (hydrocarbon-based tackifier resin; softening point: 93° C.)
Note (2) "DIANA PROCESS OIL NM280" (trademark) product of Idemitsu Kosan (process oil)
Note (3) "NOCRAC 200" (trademark), a product of Ouchi Shinko Kagaku Kogyo (phenolic antioxidant).

The results shown in Table 2 clearly indicate that the pressure-sensitive adhesive tapes according to the present invention have a good cold tack and adhesive bond strength and exhibit very excellent corrugated cardboard sealing effect.

EXAMPLES 4 AND 5

Two pressure-sensitive adhesive compositions according to the present invention were prepared by mixing block copolymers F and H with the tackifier resins, softening agent and antioxidant shown in Table 3 according to the formulation also shown in Table 3 and further dissolving the resulting mixture in toluene. Each composition was applied to the Kraft paper side of a polyethylene-laminated Kraft paper having a total thickness of 120 μm in a dry thickness of 30 μm, and the coated laminate was dried by heating in a drier to obtain a pressure-sensitive adhesive tape.

COMPARATIVE EXAMPLES 4 TO 7

Four pressure-sensitive adhesive compositions for comparison were prepared in the same manner as in Examples 4 and 5 except that the adhesive composition formulations were changed as shown in Table 3. Using these compositions, pressure-sensitive adhesive tapes were produced in the same manner as in Examples 4 and 5.

The pressure-sensitive adhesive tapes of Examples 4 and 5 and Comparative Examples 4 to 7 were subjected to corrugated cardboard sealing test (2) and corrugated cardboard holding test explained below. The test results obtained are shown in Table 3 below.

CORRUGATED CARDBOARD SEALING TEST (2)

The flaps of a commercially available corrugated cardboard box (A-1, size 640 mm×255 mm×300 mm) were folded and sealed by applying a tape sample, 5 cm square, thereto in the middle of the joint, followed by application of light pressure by the hand. The assembly was allowed to stand and the time required for the flaps to open was measured (in minutes). In this case, the assembly was also observed for cohesive failure-like displacement behavior of the adhesive. The criteria for scoring are as follows:

Apparent cohesive failure-like displacement: 3
Slight displacement: 2
No displacement but peeling in the form of adhesive failure: 1.

Each measurement value shown is the average value of 5 samples. The test was conducted at room temperature (20°-23° C.).

CORRUGATED CARDBOARD HOLDING TEST

A corrugated cardboard piece was cut from the commercially available corrugated cardboard box used in the above corrugated cardboard sealing test (2). A 25 mm wide tape sample was applied to the piece in a manner such that the adhesive length was 15 mm, followed by application of light pressure by finger. The corrugated cardboard piece was suspended so that the tap sample could hang down vertically. The tape end was then loaded with a 1 kg weight so that the force applied could be distributed uniformly over the tape adhesion area and the time required for the tape to peel off was measured (in minutes). The test was conducted at room temperature (20°-23° C.). The tape was also observed for cohesive failure-like displacement of the adhesive and scored in the same manner as in the above corrugated cardboard sealing test (2). Each measurement value shown is the average value of 5 samples.

TABLE 3

|  | Example | | Comparative Example | | | |
| --- | --- | --- | --- | --- | --- | --- |
|  | 4 | 5 | 4 | 5 | 6 | 7 |
| Adhesive composition (parts) | | | | | | |
| Block copolymer H | 40 | 20 | 100 | 80 | 60 | — |
| Block copolymer F | 60 | 80 | — | 20 | 40 | 100 |
| Tackifier resin (1) | 100 | 100 | 100 | 100 | 100 | 100 |
| Tackifier resin (2) | 30 | 30 | 30 | 30 | 30 | 30 |
| Antioxidant (3) | 2 | 2 | 2 | 2 | 2 | 2 |
| Characteristics tested | | | | | | |
| Corrugated Cardboard sealing test (2) | | | | | | |
| Time (min) | 405 | 516 | 2 | 30 | 151 | 1 |
| Cohesive failure | 2 | 3 | 1 | 1 | 1 | 3 |
| Corrugated cardboard holding test | | | | | | |
| Time (min) | >1000 | 718 | 15 | 52 | 204 | 1 |
| Cohesive failure | 2 | 2 | 1 | 1 | 1 | 3 |

Note (1) "QUINTON M100" (trademark), a product of Nippon Zeon, (petroleum-based tackifier resin)
Note (2) "WINGTACK 10" (trademark), a product of Goodyear, (tackifier resin which is liquid at ordinary temperature)
Note (3) "NOCRAC NS-6" (trademark), a product of Ouchi Shinko Kagaku Kogyo, (phenolic antioxidant).

The results shown in Table 3 above clearly show that, similar to Examples 1 to 3 above, the pressure-sensitive adhesive tapes according to the present invention exhibit very excellent corrugated cardboard sealing effect.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive composition comprising:
   100 parts by weight of a mixed block copolymer comprising:
   (a) at least 50% by weight of an $A_1$-$B_1$-$A_2$ block copolymer, wherein $A_1$ and $A_2$ each is a polymer block of a monovinyl-substituted aromatic compound, $B_1$ is a polymer block of a conjugated diene compound, $A_1$ has a number average molecular weight of 10,000 or more, $A_2$ has a number average molecular weight of 5,000 or less, and the total content of $A_1$ and $A_2$ is 50% by weight or less based on the weight of the block copolymer, and
   (b) 50% by weight or less of at least one block copolymer selected from the group consisting of $A_3$-$B_2$-$A_4$ and $(A_5$-$B_3)_nX$, wherein $A_3$, $A_4$ and $A_5$ each is a polymer block of a monovinyl-substituted aromatic compound having a number average molecular weight of 8,000 or more, $B_2$ and $B_3$ each is a polymer block of a conjugated diene compound, X is a residue of a coupling agent, n is an integer of 2 to 6, and the total content of $A_3$ and $A_4$ and the total content of $n \times A_5$ each is 50% by weight or less based on the weight of the respective copolymer, and
   from 20 to 400 parts by weight of a tackifier resin.

2. A pressure-sensitive adhesive composition as in claim 1, wherein $A_1$ has a number average molecular weight of from 12,000 to 40,000.

3. A pressure-sensitive adhesive composition as in claim 1, wherein $A_2$ has a number average molecular weight of from 500 to 3,000.

4. A pressure-sensitive adhesive composition as in claim 1, wherein the $A_1$-$B_1$-$A_2$ block copolymer has a number average molecular weight of from 50,000 to 700,000.

5. A pressure-sensitive adhesive composition as in claim 1, wherein the total content of $A_1$ and $A_2$ is from 8 to 30% by weight based on the weight of the $A_1$-$B_1$-$A_2$ block copolymer.

6. A pressure-sensitive adhesive composition as in claim 1, wherein the total content of $A_1$ and $A_2$ is from 10 to 20% by weight based on the weight of the $A_1$-$B_1$-$A_2$ block copolymer.

7. A pressure-sensitive adhesive composition as in claim 1, wherein $A_3$ and $A_4$ each has a number average molecular weight of from 12,000 to 40,000.

8. A pressure-sensitive adhesive composition as in claim 1, wherein the different in the number average molecular weight between $A_3$ and $A_4$ is about 4,000 or less.

9. A pressure-sensitive adhesive composition as in claim 1, wherein the $A_3$-$B_2$-$A_4$ block copolymer has a number average molecular weight of from 50,000 to 700,000.

10. A pressure-sensitive adhesive composition as in claim 1, wherein the total content of $A_3$ and $A_4$ is from 8 to 30% by weight based on the weight of the $A_3$-$B_2$-$A_4$ block copolymer.

11. A pressure-sensitive adhesive composition as in claim 1, wherein the total content of $A_3$ and $A_4$ is from 10 to 20% by weight based on the weight of the $A_3$-$B_2$-$A_4$ block copolymer.

12. A pressure-sensitive adhesive composition as in claim 1, wherein $A_5$ has a number average molecular weight of from 12,000 to 40,000.

13. A pressure-sensitive adhesive composition as in claim 2, wherein the total content of $n \times A_5$ is from 8 to 30% by weight based on the weight of the $(A_5$-$B_3)_nX$ block copolymer.

14. A pressure-sensitive adhesive composition as in claim 2, wherein the total content of $n \times A_5$ is from 10 to 20% by weight based on the weight of the $(A_5$-$B_3)_nX$ block copolymer.

15. A pressure-sensitive adhesive composition as in claim 1, wherein the $(A_5$-$B_3)_nX$ block copolymer has a number average molecular weight of from 50,000 to 700,000.

16. A pressure-sensitive adhesive composition as in claim 1, wherein the amount of Component (a) in the mixed block copolymer is from 50 to 95% by weight.

17. A pressure-sensitive adhesive composition as in claim 16, wherein the amount of Component (a) is from 60 to 90% by weight.

18. A pressure-sensitive adhesive composition as in claim 1, wherein the amount of Component (b) in the mixed block copolymer is from 5 to 50% by weight.

19. A pressure-sensitive adhesive composition as in claim 18, wherein the amount of Component (b) is from 10 to 40% by weight.

20. A pressure-sensitive adhesive composition as in claim 1, wherein the tackifier resin is selected from the group consisting of terpene resins, terpene-phenol resins, terpene-aromatic resins, coumarone-indene resins, styrenic resins, petroleum resins, phenol resins, xylene resins, rosin resins, and mixtures thereof.

21. A pressure-sensitive adhesive composition as in claim 1, wherein the amount of the tackifier is from 50 to 300 parts by weight per 100 parts by weight of the mixed block copolymer.

22. A pressure-sensitive adhesive composition as in claim 1, wherein, $A_1$, $A_2$, $A_3$, $A_4$ and $A_5$ in the block copolymer components (a) and (b) each is a polystyrene block and $B_1$, $B_2$ and $B_3$ in the block copolymer components (a) and (b) each is a polyisoprene block.

23. A pressure-sensitive adhesive composition as in claim 1, which further contains 50 parts by weight or less, per 100 parts by weight of the block copolymer components, of a polymer component selected from at least one of an elastomer and a plastomer other than said block copolymer components and also excluding a tackifier resin and a softening agent.

* * * * *